United States Patent [19]
Merrill et al.

[11] Patent Number: 5,752,667
[45] Date of Patent: May 19, 1998

[54] DRAG MECHANISM FOR A FISHING REEL SPOOL

[75] Inventors: Scott T. Merrill, Mounds; Robert L. Forslund, Catoosa; Ronald M. Cross, Tulsa, all of Okla.

[73] Assignee: Brunswick Corporation, Lake Forest, Ill.

[21] Appl. No.: 702,109

[22] Filed: Aug. 23, 1996

[51] Int. Cl.[6] .................................................. A01K 89/033
[52] U.S. Cl. .................................................. 242/296; 242/317
[58] Field of Search .................................. 242/296, 306, 242/317; 254/352

[56] References Cited

U.S. PATENT DOCUMENTS

| | | |
|---|---|---|
| 1,612,177 | 12/1926 | Catucci . |
| 1,811,073 | 6/1931 | Burdick . |
| 2,486,559 | 11/1949 | Fuller . |
| 2,489,457 | 11/1949 | Maerk . |
| 2,551,567 | 5/1951 | Reyburn . |
| 2,569,322 | 9/1951 | Mayhew . |
| 2,578,978 | 12/1951 | Mandolf et al. . |
| 2,598,846 | 6/1952 | Smith et al. . |
| 2,783,001 | 2/1957 | Grice . |
| 3,047,114 | 7/1962 | Stevens, Jr. ............... 254/352 |
| 3,136,497 | 6/1964 | Wood, Jr. . |
| 3,478,977 | 11/1969 | Sarah . |
| 3,574,339 | 4/1971 | Sarah . |
| 3,779,477 | 12/1973 | Humble . |
| 3,989,204 | 11/1976 | Lemery . |
| 4,168,041 | 9/1979 | Moosberg . |
| 4,468,005 | 8/1984 | Nakamura ................. 254/352 |
| 4,515,325 | 5/1985 | Ito . |
| 4,527,753 | 7/1985 | Jones . |

FOREIGN PATENT DOCUMENTS

| | | | |
|---|---|---|---|
| 687539 | 2/1953 | United Kingdom | 242/296 |
| 815739 | 7/1959 | United Kingdom | 242/296 |
| 826389 | 1/1960 | United Kingdom | 242/296 |

*Primary Examiner*—Katherine Matecki
*Attorney, Agent, or Firm*—Rosenblatt & Redano, P.C.

[57] ABSTRACT

A fly fishing reel is disclosed which allows for a simplified construction allowing for reversibility of the drag effect on a spool to facilitate left- or right-hand operation without disassembling small parts which can be lost in the boat. The spool structure is strengthened by virtue of a tapered design. A snap-on cap doubles as a support for a spring that holds the spool to a shaft.

2 Claims, 5 Drawing Sheets

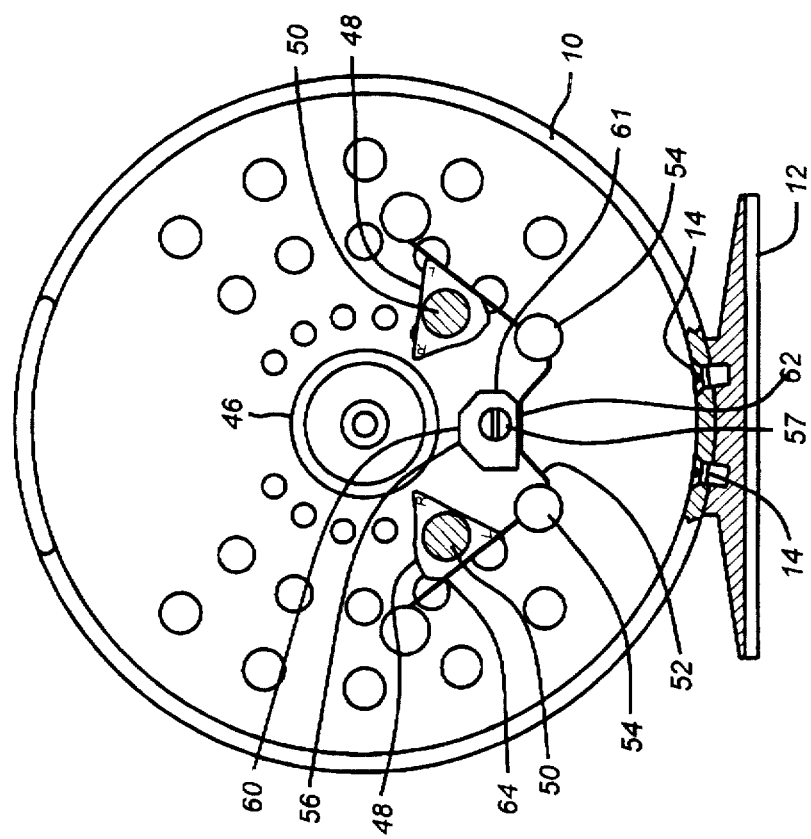
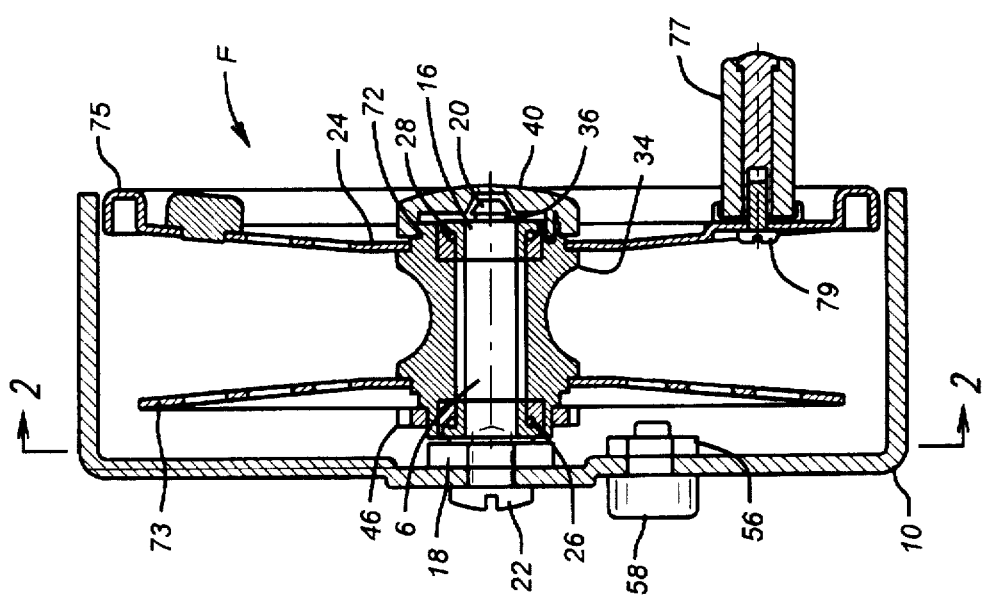

5,752,667

DRAG MECHANISM FOR A FISHING REEL SPOOL

FIELD OF THE INVENTION

The field of this invention relates to design components of fishing reels, particularly those useful in fly fishing.

BACKGROUND OF THE INVENTION

Fly fishing reels have been in use for many years. These reels have had devices to impede rotation of the reel in a given direction. Generally, these mechanisms have provided a fixed or variable drag in one direction and little or no resistance in the opposite direction. A wide variety of mechanisms has been used to accomplish the drag force on the fishing reel. These devices in the past have involved gears and pawls. Typical of such designs are U.S. Pat. Nos. 2,578,978; 4,168,041; 1,811,073; 2,551,567; 3,136,497; 2,783,001; 3,478,977; 3,574,339; 4,515,325; and 4,527,753. Many of these structures had to be partially disassembled if the direction of the applied drag was to be reversed. Accordingly, some of the prior designs, such as that illustrated in U.S. Pat. No. 2,578,978, would apply drag in a single direction through the contact of a leaf spring on a pawl which was secured by a slot straddling a pin. Thus, when the line was being wound onto the spool and the gear illustrated in FIG. 3 turned in the direction of arrow B, a reduced resistance from the pawl 4 was encountered, as compared to rotation in the opposite direction A where the leverage exacted on the pawl 4 by the leaf spring 5 provided a greater resistance to paying out the line. However, this design did not accommodate conversion from left-hand to right-handed operation without disassembly of parts. Accordingly, one of the objectives of the present invention is to provide a drag system that allows for simple conversion from left- to right-handed operation without disassembly of parts. To facilitate such flexibility, a pawl design has been developed which selectively applies more drag in a rotation in a first mode than in a reverse rotation in a second mode. By merely manipulating a pawl without disassembling it, the direction of rotation of the reel, which will encounter the enhanced drag, can be reversed. Accordingly, a simple design is provided to facilitate left- and right-handed operation as one of the objectives of the present invention.

In the past, fly fishing reels have had generally opposed parallel end plates. Such structures are disclosed in U.S. Pat. Nos. 2,489,457; 2,486,559; 3,779,477; 1,612,177; 3,989,204; 2,569,322; and 2,598,846. In these prior designs, the usual construction has involved parallel outer faces on the spool segments, which has resulted in undue flexure and lack of structural rigidity in a construction where lightweight is of significance. Accordingly, it is another object of the present invention to provide a spool whose sidewalls are initially parallel and then taper outwardly away from each other to provide greater structural strength. Additionally, the lightweight nature of the spool is retained but stiffened at the outer periphery for support of the handle without undue flexure of the spool wall.

In prior designs, end caps that had been used in fly fishing reels to secure the assembly of the spool to a shaft have been screwed into the spool hub. This method of fastening the end caps has been inconvenient for the fishermen because when it came time to disassemble the spool from the shaft, small parts could be dropped and lost. Thus, a more convenient method of disassembly of the fly fishing reel was needed to improve on the fastening techniques illustrated in the prior art which involved small parts. Typical of such prior designs are U.S. Pat. Nos. 4,883,238; 2,548,317; 3,986,679; 3,490,714; 2,993,660; 2,689,691; 2,523,827; 4,461,435; 3,526,370; and 3,591,107.

It is thus another object of the present invention to supply a snap-on end cap which requires no separate fasteners. Another objective of the present invention is to secure a leaf spring which maintains the relative position of the spool with respect to the supporting shaft with the snap-on end cap.

SUMMARY OF THE INVENTION

A fly fishing reel is disclosed which allows for a simplified construction allowing for reversibility of the drag effect on a spool to facilitate left- or right-hand operation without disassembling small parts which can be lost in the boat. The spool structure is strengthened by virtue of a tapered design. A snap-on cap doubles as a support for a spring that holds the spool to a shaft.

BRIEF DESCRIPTION OF THE DRAWINGS

FIG. 1 is a sectional elevational view of the fishing reel of the present invention.

FIG. 2 is the view along lines 2—2 of FIG. 1, additionally showing the reel foot.

DETAILED DESCRIPTION OF THE PREFERRED EMBODIMENT

Figure 4:
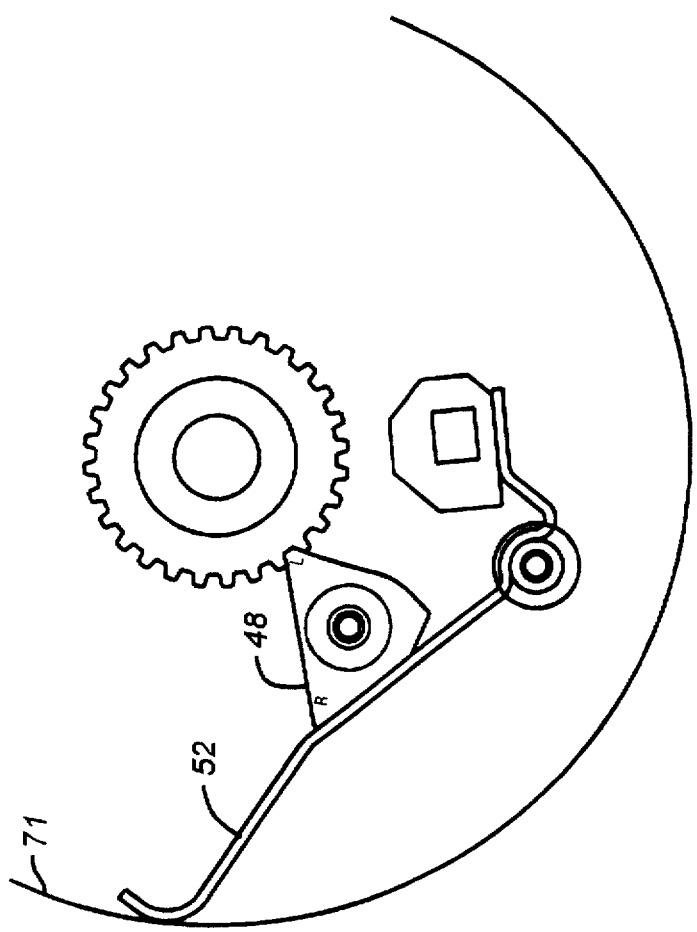
FIG. 4 is an alternative to the drag assembly illustrated in FIG. 2.

The basic components of the fishing reel F can be seen from FIG. 1. The type of reel illustrated is primarily used for fly fishing, although other types of reels illustrating the described structures or variants thereof are considered to be within the purview of the invention. Referring now to FIG. 1, a spool 24 is mounted over a stub shaft or spindle 6. A screw 22 secures the spindle 6 to the frame 10. As shown in FIG. 2, screws 14 secure the frame 10 to a reel foot 12. The reel foot 12 is used to secure the fly reel F to a rod (not shown). The spool 24 is able to rotate with respect to spindle 6 due to the presence of bearings 26 and 28. The spindle 6 has on one end a shoulder 18 which abuts the frame 10. At the opposite end of the hub 16 is a conical terminating portion 20. A cap 40 is snapped onto the spool 24 such that it covers over the conical end portion 20, as shown in FIG. 1.

It should be noted that the snap-acting feature of the cap 40 makes it simple to remove and replace and eliminates a threaded connection which can become hard to make up after periods of use and exposure to the elements. Additionally, by using the snap feature of the cap 40, a fastener is eliminated and a neater design is presented which is easier for the fisherman to use.

Figure 3:
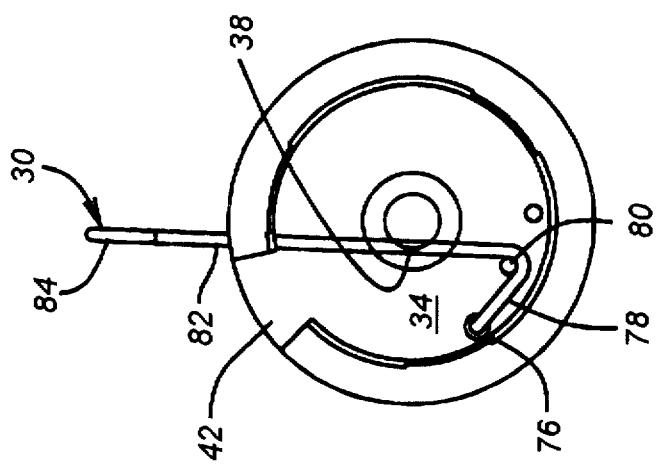
FIG. 3 illustrates the attachment of the reel to the shaft.
Figure 8:
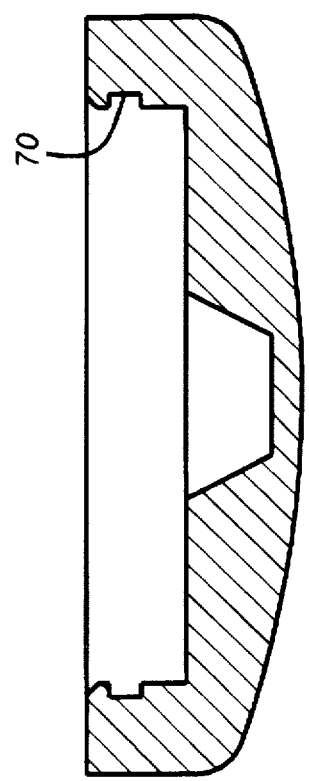
FIG. 8 is a section through the snap-on cap.
Figure 7:
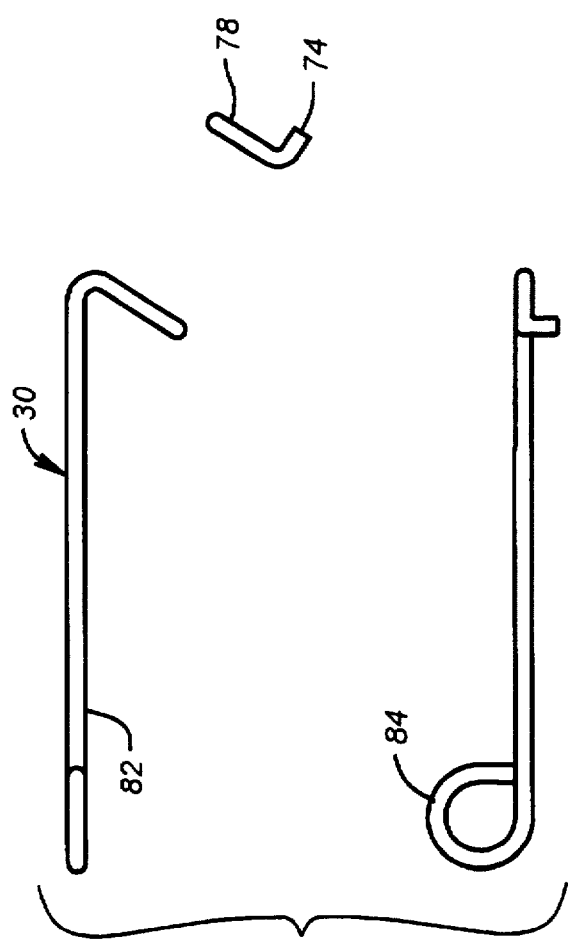
FIG. 7 illustrates the details of the spring used to secure the reel to the shaft, as illustrated in FIG. 3.
Figure 11:
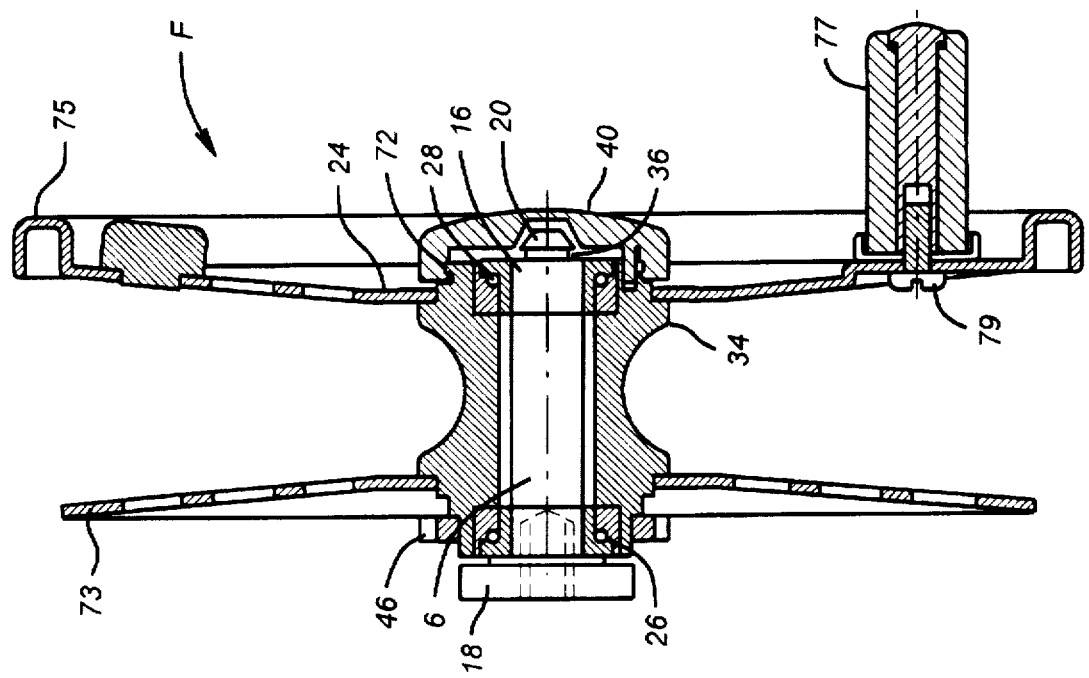
FIG. 11 is a larger, more detailed view of the hub and shaft shown in FIG. 1.
Figure 9:
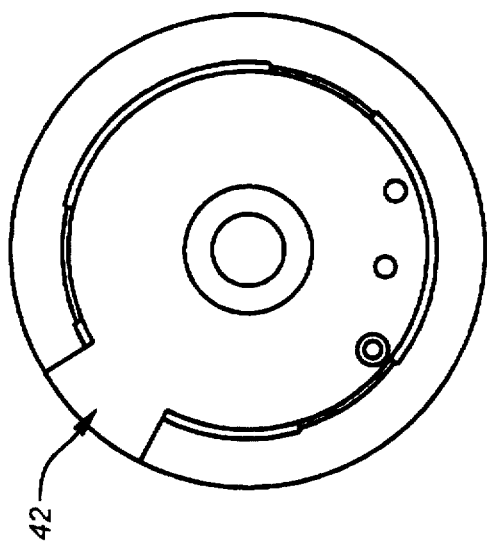
FIG. 9 is a front view of the cap of FIG. 8, showing an opening at the edge for a slot.
Figure 10:
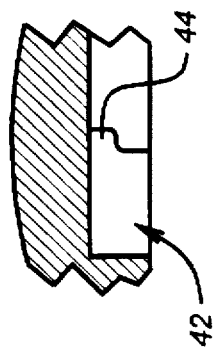
FIG. 10 is a detail of FIG. 9, showing the retaining slot for a leaf spring which holds the hub to the shaft.

FIGS. 8 and 9 illustrate the cap design in more detail. The cap 40 is circular and has an internal circular groove 70, as shown in FIG. 8. The groove 70 fits over a circular tang or rib 72 to secure the fit of the cap 40. The cap 40 has a circumferential opening 42, as shown in FIG. 9. Opening 42 further has a groove or catch slot 44, as shown in FIG. 10. The construction of the retainer, in the preferred embodiment being a spring 30, is shown in FIG. 7. The lower end 74 extends into a depression 76 in the cap 40, as shown in FIGS. 3 and 9. The spring 30 then has a short transverse segment 78 which hooks around a pin 80 trapping cap 40, as shown in FIG. 3. Finally, the spring 30 has a long extending middle portion 82, with a loop 84 at its upper end. As shown in FIG. 3, the long segment 82 extends through opening or slot 42 and is trapped in the groove or catch slot 44 within the opening 42. When placed in that position, the long segment 82 engages a groove 36, as shown in FIG. 11. Groove 36 is on the shaft 16 such that when the long segment 82 of the spring 30 extends therethrough, hub 34 is secured to the shaft 16. The contact point to accomplish the securing function is illustrated in FIG. 3 as 38.

Figure 6:
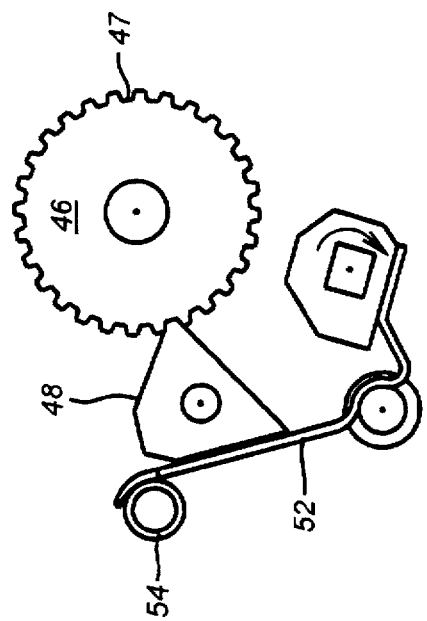
FIG. 6 shows yet another alternative embodiment to the drag feature illustrated in FIG. 2.

A drag mechanism is provided in a variety of embodiments. The drag mechanism is used to provide resistance to spool rotation with selectively more resistance if the spool 16 rotates in one direction as opposed to the opposite direction. As seen in FIG. 11, the hub 34 has a ratchet gear 46 attached thereto. As shown in FIGS. 1 and 2, mounted to the frame 10 is one embodiment of a drag assembly. A cam 56 is secured by a fastener 57 for rotatable movement by an exterior knob 58, as shown in FIG. 1. Leaf spring 52 is a biasing member that bears against the cam 56 and engages pivot studs 54. At least one pawl 48 is mounted on a corresponding stud 50, while the ends of the spring 52 bear on the pawl or pawls 48. It should be noted that FIG. 2 shows an embodiment with two pawls, while FIG. 6 shows a single pawl embodiment. One or more pawls in combination with springs or biasing members, as shown, can be used without departing from the spirit of the invention. In the preferred embodiment of FIG. 2, two pawls 48 are used, each respectively pivoting around a stud 50.

The cam 56 has surfaces 60 and 61 which are at different distances from the pivot pint 57. As a result of rotation of the cam 56 via knob 58 mounted to the housing or frame 10, surfaces 60 or 61 present themselves opposite segment 62 of spring 52. In the preferred embodiment, spring 52 is a leaf spring. It can be seen that since surface 60 is further away from the pivot point 57 than surface 61, that aligning surface 60 with segment 62 of leaf spring 52 will put a greater force on the pawls 48, making them generally more resistant to turning when the teeth of the ratchet gear 46 are trying to click past. This is shown clearly in FIG. 6 where the teeth 47, when the gear 46 is rotating in a counterclockwise direction, are required to displace in a clockwise direction the pawl 48 against the force of the end of the spring 52.

Figure 5:
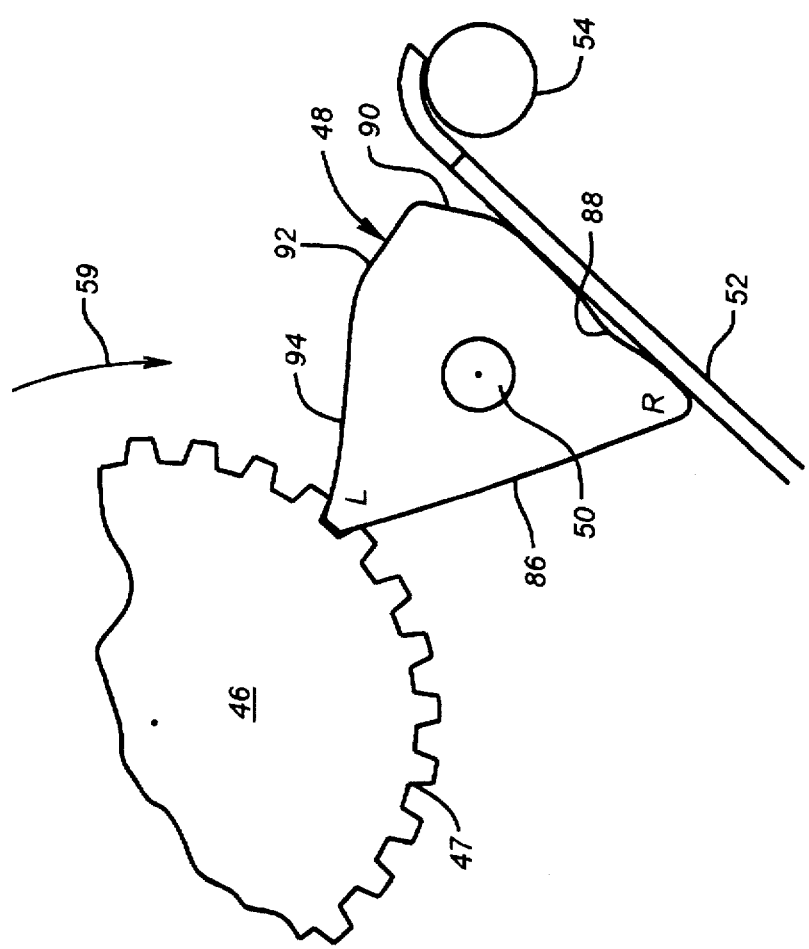
FIG. 5 is another alternative embodiment to the drag assembly shown in FIG. 2, showing the reversible feature.

Referring more particularly to FIGS. 5 and 6, it can be seen that the pawl 48 has a particular shape so that it presents more drag on the reel only for one given direction of rotation and presents no resistance or minimal resistance in the opposed direction. This feature is illustrated in the pawl of FIG. 5 which, for clarity, has been labeled with the letters L and R to indicate the given directions of turning of the gear 46 for which there will be increased resistance. The areas of pawl 48 where the interaction with teeth 47 occurs is shown as an "angle." "Angle," as used herein, includes other end shapes that interact with a gear 46 or other equivalent contact area on spool 24. As seen in FIG. 5, the pawl 48 is set up to provide a greater drag force when the gear 46 is turning in the clockwise direction, as indicated by the arrow 59. To better understand the operation, the various surfaces of pawl 48 will be identified. Pawl 48 comprises of surface 86, a first biasing surface having components 88 and 90, and a second biasing surface having components 92 and 94. As seen in FIG. 5, the first biasing surface has a first component 88, generally aligned with spring 52, and a second compoent 90, misaligned with spring 52. Angle L, when engaged to gear 46, is disposed on the opposite side of pivot 50 from first component 88 and generally on the same side of pivot 50 as second component 90 before rotation begins. These same relationships apply when angle R is in contact with gear 46 as to surfaces 94 and 92.

In the position shown, when the ratchet gear 46 is trying to rotate in a clockwise direction as shown by arrow 59, the broad, long edge 88 is sitting up against the leaf spring 52. It thus takes significantly more effort for the teeth 47 to rotate the pawl 48 around the pivot point 50. This is to be contrasted with ratchet gear 46 turning in a opposite direction from arrow 59, i.e., counterclockwise, when in the position shown in FIG. 5. When the ratchet gear 46 turns counterclockwise, the teeth 47 are trying to turn the pawl 48 in a clockwise direction onto surface 90. Because surface 90 is recessed away from leaf spring 52, less resistance to clockwise rotation of the pawl 48 is offered when in the position shown in FIG. 5. Exactly the opposite of the above is true when the pawl is arranged such that the corner marked R is in engagement with the teeth and surfaces 94 and 92 are adjacent the leaf spring 52.

It can be seen that the pawl 48, whether one or more are used, is secured through the pivot connection 50 and can be easily rotated by a fisherman upon removal of the hub 34 from the shaft 16. This can be easily accomplished by pushing back the loop 84 on the spring 30 (see FIG. 3). When the long segment 82 comes out of the slot 44 (see FIGS. 3 and 10), the hub 34 slides easily off the shaft 16, exposing access to the drag assembly including pawl 48 and leaf spring 52. At this time, pawl 48 can be rotated while still secured by pivot connection; 50.

The embodiment in FIG. 4 is operationally identical to the embodiment shown in FIG. 5 except that the leaf spring 52 extends beyond the pawl 48 to the side wall 71 of frame 10. This construction provides additional support for the spring 52 since it is no longer cantilevered as shown in the embodiments of FIGS. 2, 5, and 6.

An immediate advantage is apparent to those of ordinary skill in the art in that the design of the pawl, including a left- or right-hand drag feature, can be easily converted from left drag to right drag by simply pulling the hub 34 out of the frame 10 and manually pushing away the leaf spring 52 and quickly rotating the pawl 48 to put it in the position where it is shown in FIG. 5 or in the other position where the corner marked R is in contact with the gears 47. Since the pawl 48 is attached at pivot 50, this represents an improvement over past designs in that it is simple and small parts need not be detached to convert the drag from left-hand to right-hand orientation.

Another feature of the present invention is illustrated in FIGS. 1 and 11. Referring now to FIG. 11, it can be seen that the spool 24 has a generally tapered construction so that the outer ends 73 and 75 flare away from each other as one moves radially outwardly from the hub 34. On the outer portion of the spool 24, the wind crank 77 is secured with a fastener 79. For additional strength, the cross-section at the end 75 of the spool 24 is generally U-shaped. This provides an external stiffening rib which reduces flexing when operating the crank 77. The U-shaped end segment 75, in conjunction with the outward taper of the spool 24, adds structural rigidity to the assembly, thus reducing flexing and facilitating ease of use of the fly fishing reel F.

The foregoing disclosure and description of the invention are illustrative and explanatory thereof, and various changes in the size, shape and materials, as well as in the details of the illustrated construction, may be made without departing from the spirit of the invention.

We claim:

1. A fishing reel, comprising:

a frame;

a spool rotatably mounted to said frame;

a drag mechanism supported by said frame and engaging said spool for selective reversible application of a greater drag force when the spool rotates in a first direction as opposed to a reversed second direction;

said drag mechanism is pinned to said frame precluding any component disassembly from said frame when reconfiguring said drag mechanism to a position where a greater drag force is applied to said spool when rotating in said second direction than in said first direction;

said drag mechanism comprises at least a first and second pawl on said frame, pivotally mounted to engage said spool;

a leaf spring acting on said pawls;

wherein at least one of said pawls further comprises a first and a second angle, each of said angles selectively positionable in contact with said spool, said pawl further comprises first and second biasing surfaces, respectively opposed to said first and second angles such that said first biasing surface is at least in part touching said leaf spring when said first angle contacts said spool and said second biasing surface is at least in part touching said biasing member when said second angle contacts said spool;

said first and second biasing surfaces each have a first component in a different plane than an adjacent second component;

said first components of each of said first and second biasing surfaces is touching said leaf spring when a corresponding said first or second angle contacts said spool;

said second components of each of said first and second biasing surfaces is not touching said leaf spring when a corresponding said first or second angle contacts said spool;

said pawl providing less resistance to said spool when rotation of said spool rotates said pawl so as to advance said second component, as opposed to said first component, of a corresponding biasing surface against said leaf spring;

and a cam mounted to said frame and acting on said leaf spring to adjust applied force to said pawls.

2. A fishing reel, comprising:

a frame;

a spool rotatably mounted to said frame;

a drag mechanism supported by said frame and engaging said spool for selective reversible application of a greater drag force when the spool rotates in a first direction as opposed to a reversed second direction;

said drag mechanism mounted to said frame in a manner which does not require any component disassembly from said frame to reconfigure said drag mechanism to a position where a greater drag force is applied to said spool when rotating in said second direction than in said first direction;

said drag mechanism further comprises at least two pawls on said frame pivotally mounted to engage said spool;

a leaf spring on said frame to engage said pawls;

a cam on said frame contacting said leaf spring;

wherein said cam acts on said leaf spring to adjust the applied force to said pawls.

* * * * *